United States Patent
Wilson et al.

Patent Number: 5,289,548
Date of Patent: Feb. 22, 1994

[54] COMPRESSION AND RECONSTRUCTION OF RADIOLOGICAL IMAGES

[75] Inventors: Dennis L. Wilson, Palo Alto; James T. Stenstrom, Mountain View, both of Calif.

[73] Assignee: Loral Aerospace Corp., New York, N.Y.

[21] Appl. No.: 906,787

[22] Filed: Jun. 30, 1992

[51] Int. Cl.⁵ .................................... G06K 9/36
[52] U.S. Cl. ........................... 382/56; 382/6; 358/433
[58] Field of Search ............... 382/56, 50, 6; 358/432–433, 133, 427, 261.3; 364/715.02

[56] References Cited

U.S. PATENT DOCUMENTS

| | | | |
|---|---|---|---|
| 4,745,474 | 5/1988 | Schiff | 358/133 |
| 4,774,574 | 9/1988 | Daly et al. | 358/133 |
| 4,939,645 | 7/1990 | Hopkinson | 364/413.19 |
| 5,046,121 | 9/1991 | Yonekawa | 382/56 |
| 5,063,608 | 11/1991 | Siegel | 382/56 |
| 5,109,451 | 4/1992 | Aono et al. | 358/133 |
| 5,170,264 | 12/1992 | Saito et al. | 358/433 |

Primary Examiner—Leo H. Boudreau
Assistant Examiner—Larry J. Prikockis
Attorney, Agent, or Firm—Kenneth W. Float; Anthony W. Karambelas

[57] ABSTRACT

The present invention provides for a compression scheme tailored to the compression of large radiological images processed with image processing workstations. The compression scheme is a variation of the CCITT JPEG compression scheme with special care taken to suppress blocking effects of the 8×8 discrete cosine transform used therein. In accordance with the present invention, an original image is downsampled, then interpolated back to its original size, resulting in a smoothed image. The difference between the smoothed image and the original image is then compressed using an 8×8 discrete cosine transform with 12 bit data. Major artifacts present in the original image are due to the mismatching of the low frequency components of the image at the edges of the blocks. When the low frequencies are removed by subtracting out the low frequency components, the artifacts disappear except in areas having very large dynamic changes. The compression scheme of the present invention is particularly useful for archiving or telecommunicating images, achieving compression of more than 10:1 without loosing the characteristics of the radiological image that permit effective diagnosis. A reconstruction scheme is also disclosed which allows recovery of the image from a compressed image file.

19 Claims, 3 Drawing Sheets

COMPRESSION AND RECONSTRUCTION OF RADIOLOGICAL IMAGES

BACKGROUND

The present invention relates generally to radiological imaging, and more particularly, to image compression apparatus and methods for use in compressing and reconstructing radiological images.

The medical imaging industry is moving away from traditional film-based systems and is moving toward the use of digital images presented on computer work-stations. The images that are presented to radiologists must preserve the information contained in the original film images in order for soft copy images to be accepted by the medical community. The typical radiological image is different from other images in several ways.

Radiological images used in medicine present peculiar problems for compression compared to conventional image compression problems. The images locally have very low contrast. For example, a transition over an edge of a bone does not change the image intensity by a large amount. While the local variations are small, the dynamic range over the whole image may be quite large. Much of the information is contained in the local variation of image intensity. The overall image provides a context within which the information is embedded, but the pathology is visible as local variations. The images are subject to large changes in the individual pixel intensity as the radiologist views the image. A radiologist may change the contrast and the center of the contrast range in his efforts to see details in the image. In the extreme, the radiologist may invert the image, changing white to black. The images are very large, typically more than 1 k by 1.2 k pixels and up to 2 k by 2.5 k pixels. The image dynamic range typically requires 12 bits. The image is viewed at a number of magnifications from 2:1 minified, to 8:1 zoomed.

The well-known CCITT JPEG standard uses an 8×8 discrete cosine transform in the image compression scheme. The number of bits in the image is 8 or 12 bits. The blocking effect of the discrete cosine transform is unacceptable as an artifact over the entire image. The dynamic range of 12 bits cannot be squeezed into 8 bits. If a typical JPEG compressed image is examined in detail, the blocking of the 8×8 discrete cosine transform is visible over the whole of the image. The details of the image are visible through the blocking, but the distraction of the blocking over the whole of the image is unacceptable. The radiologist often looks at a zoomed image with contrast arranged so that the blocks interfere with his viewing of the image.

If radiological images were viewed in the same way that a TV image is viewed, the dynamic range could be compressed to 8 bits by a simple nonlinear mapping of image intensities. A typical mapping scheme is logarithmic mapping. With this scheme, displayed image intensities are proportional to the logarithm of the original image intensities. Since the image contrast and intensity center can be varied, including inverting the pixel values, such nonlinear mapping is not appropriate. No companding of the image intensity values is tolerable, since the compression from 12 bits to 8 bits introduces large artifacts at some level of contrast or center for the displayed intensity values.

Other techniques that are used for image compression are typically full image compression schemes. Either a Fourier transform or a cosine transform is used over the full image. Since the transform is a full image transform, there is no blocking of the image. The difficulty with the full image transform is that the amount of computation per pixel is large and the images, in many cases, are constrained to be square images. If the images are not square, they are padded to make them square. In many implementations, the number of pixels in the image that is compressed is constrained to be a power of two. Again the images must be padded with zeros to make them a power of two.

In view of the above, it is an objective of the present invention to provide for apparatus and methods that provide for image compression of radiological images that suppresses artifacts present in the image due to blocking.

SUMMARY OF THE INVENTION

The present invention provides for a compression scheme tailored to the compression of large radiological images displayed using image workstations. The present invention may be implemented as a special purpose processor for use in a computer workstation, for example, or may be implemented in firmware or software if so desired. The compression scheme is a variation of CCITT JPEG compression that is adapted to suppress blocking effects caused by the processing of images with discrete cosine transforms used in conventional JPEG compression. The compression is particularly useful for archiving or telecommunicating images, achieving compression of more than 10:1 without loosing the characteristics of the original radiological image. Furthermore, the apparatus and method of the present invention produces a compressed radiological image that permits effective diagnosis.

In order to achieve the above and other objectives, the present invention provides for image compression apparatus and methods for use with radiological images that suppresses artifacts present in the image due to blocking. The present invention reduces the size of digitized radiological images for storage or for transmission such that the images remain clinically useful for diagnosis. The present invention provides for the separation of low frequency components for suppression of compression artifacts combined with a block mode transform compression for localizing compression noise. The present invention suppresses block artifacts in compression while providing for compression noise with a controlled local signal-to-noise ratio.

The suppression of artifacts due to blocking is accomplished by the use of a difference image. The original image is downsampled, then interpolated back to its original size to produce a smoothed image. The difference between the smoothed image and the original image is then compressed using an 8×8 discrete cosine transform with 12 bit data. The major artifacts present in the original image are due to the mismatching of the low frequency components of the image at the edges of the blocks. Consequently, when the low frequencies are removed by subtracting out the low frequency components, the artifacts disappear except in areas having very large dynamic changes.

To make the quantization noise relative to the magnitude of local variations in the image, the total energy in the transform block is normalized, then weighted, quantized, and coded. The normalization is accomplished by finding the sum of the squares of coefficients of the cosine transform. A gain factor is determined such that the energy in a block is equal to a constant. This gain factor is applied to each of the coefficients of the transform, changing the energy in the block to a constant value that is equal to the normalization energy. The coefficients are then quantized by rounding (not truncating) to the nearest integer. An exception is made if the energy in the block is larger than a predetermined threshold. In this case, no normalization is performed. The coefficients are quantized at the original level. When the energy is high, the dynamic range of the image in that vicinity is high, leading to more prominent blocking effects. When the block is not normalized, the quantization noise is reduced, thus suppressing the blocking effects.

The coding of the weighted coefficient values may be done in several ways. The use of a Huffman code or an approximate Huffman code is one technique. The Huffman code uses short code words to transmit coefficient values that happen often and longer code words to transmit coefficient values that are less probable. The average code word length is smaller using this approach than using a fixed length code word. An energy normalization parameter controls the amount of compression accomplished by the Huffman coding. When the normalization constant is small, the numbers to be encoded are small. The reduction of the range of numbers to be encoded reduces the number of bits required to encode the numbers.

An alternative to Huffman coding is to use arithmetic coding. This approach codes the weighted, quantized coefficients in a code word that maps the coefficient values into the interval from zero to one. The arithmetic coding scheme may be made adaptive, and thus be independent of the type of image in contrast to the image type sensitivity of the Huffman coder.

The discrete cosine transform yields a set of transform coefficients. The coefficients roughly describe the energy levels at frequencies in the row and column directions in the image. The human eye is less sensitive to noise at high frequencies, thus permitting coarser quantization at higher frequencies. The coarser quantization is accomplished by frequency weighting the transform coefficients. Lower weights are given to higher frequency components.

The compression of the image is accomplished by deleting the high frequency components with little energy and using Huffman (or other) coding on the remaining quantized discrete cosine transform coefficients to compress them. The level of quantization of the discrete cosine transform coefficients is adjusted by setting a quantization level that depends on the energy in the block. When the block energy is high, the quantization level is high. With such large images the noise generated by the quantization is a white noise over the entire image. The human eye can look through such noise, averaging the intensity values in a local region to suppress the noise. Even severe noise only appears to be a general haziness to the image.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
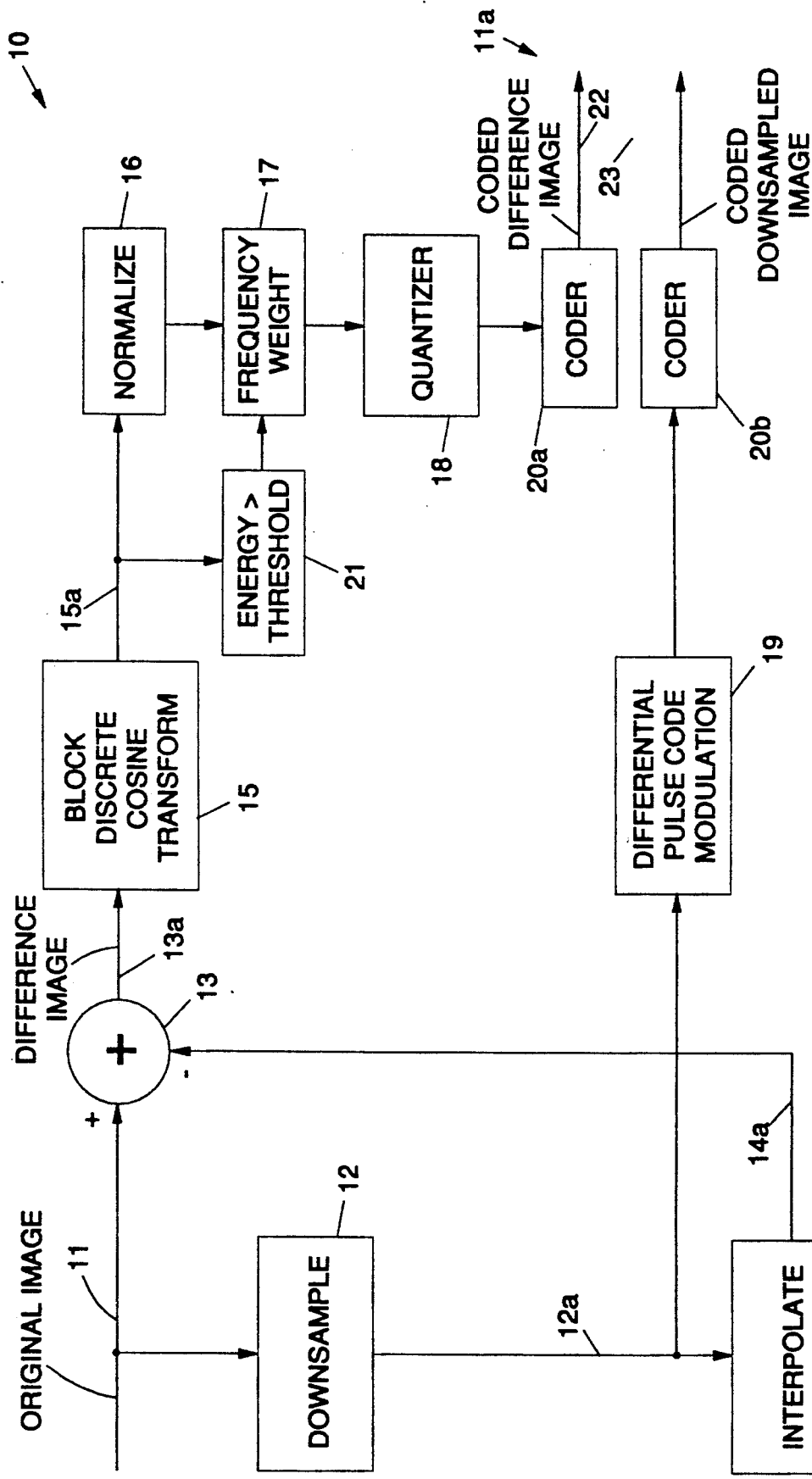
FIG. 1 shows an image compression apparatus and method in accordance with the principles of the present invention.

Referring to the drawing figures, the architecture and processing flow of an image compression apparatus and method 10 in accordance with the principles of the present invention is shown in FIG. 1. More particularly, FIG. 1 shows the use of downsampling and interpolation processes that eliminate low frequency components from a discrete cosine transformed image. The suppression of artifacts in an original image 11 due to the blocking is accomplished by the use of a difference image 13a. An original image 11 is downsampled 12 to produce a downsampled image 12a, which is then interpolated 14 back to the size of the original image 11. Interpolating the downsampled image 12a produces a smoothed image 14a. The difference image 13a is produced between the original image 11 and the interpolated image 14a using an adder 13. The difference between the smoothed image 14a and the original image 11 is then compressed 15 using an 8×8 pixel block discrete cosine transform with 12 bit data. This produces a transformed image 15a. Major artifacts that are present in the original image 11 are due to the mismatching of low frequency components in the original image 11 at the edges of the blocks. When the low frequencies are removed and separately coded 20a by subtracting out the low frequency components to produce a coded difference image 22, the artifacts disappear except in areas of very large dynamic changes.

To make quantization noise present in the difference image 13a relative to the magnitude of local variations, the total energy in the transform block (transformed image 15a) produced by compression is normalized 16, and is then weighted 17, quantized 18, and encoded by the coder 20a. The normalization 16 is accomplished by finding the sum of the squares of the coefficients of the discrete cosine transform. A gain value such that the block energy is equal to a constant is determined. This gain value is applied to each of the coefficients of the transform, changing the energy in the block to a constant value equal to the normalization energy. The coefficients are then quantized 18 by rounding (not truncating) them to the nearest integer. An exception is made if the energy in the block is larger than a predetermined threshold. In this case, no normalization 16 is performed, and the coefficients are quantized 18 at the original level. When the energy is high, the dynamic range of the image in that vicinity is high, leading to more prominent blocking effects. When the block is not normalized 16, the quantization noise is reduced, suppressing the blocking effects. The above processing produces the coded difference image 22 that is a first part of a compressed image file 11a.

The downsampled image 12a is differential pulse code modulated 19 and is also encoded in a second coder 20b using the same coding scheme as is used for the quantized, weighted transform coefficients. This produces a coded downsampled image that forms a second part of the compressed image file 11a.

The encoding 20a of the weighted coefficients may be done in several ways. The use of a Huffman code or an approximate Huffman code is a technique to code the weighted coefficients. The well-known Huffman code uses short code words to transmit coefficients that happen often and longer code words to transmit coefficients that are less probable. The average code word length is smaller using this approach than using a fixed length code word. An energy normalization parameter controls the amount of compression accomplished by the Huffman coding. When the normalization constant is small, the numbers to be encoded are small. The reduction of the range of numbers to be encoded reduces the number of bits required to encode the numbers.

An alternative to the use of Huffman coding is the use of arithmetic coding. This approach codes the weighted, quantized coefficients in a code word that maps the coefficients into an interval from zero to one. This scheme may be made adaptive, and is thus independent of the type of image in contrast to the image type sensitivity of the Huffman coder.

The discrete cosine transform compression 15 produces a set of transform coefficients. The coefficients roughly describe the energy levels at frequencies in the row and column directions of pixels in the original image 11. The human eye is less sensitive to noise at high frequencies, permitting coarser quantization 18 at the higher frequencies. The coarser quantization 18 is accomplished by frequency weighting the transform coefficients. Lower weights are given to the higher frequency components.

The compression achieved by the present invention is accomplished in two ways, the deletion of the high frequency components with little energy and the use of Huffman coding, for example, on the remaining quantized discrete cosine transform coefficients. The level of quantization 18 of the discrete cosine transform coefficients is adjusted by setting a quantization level that depends on the energy in the block. When the block energy is high, the quantization level is high. With such large images the noise generated by the quantization 18 is a white noise over the entire original image 11. The eye looks through such noise, averaging the intensity values in a local region to suppress the noise. Even severe noise appears to be only a general haziness to the image.

On the other hand the deletion of the high frequency components of the original image 11 tends to make the image 11 less crisp. Carried to an extreme, essential detail begins to disappear from the image 11. If the energy were uniformly distributed over the discrete cosine transform coefficients, the deletion of one coefficient removes about 1.6% of the energy. Ninety percent of the energy would be contained in 57 of 64 coefficients. The energy is not uniformly distributed and is contained mostly in the low frequency components. Typically 45 coefficients remain when the energy retained is 95% of the original energy and 12 coefficients are retained when the energy retained is 50% of the energy.

The implementation of the elements of the compression scheme of the present invention are important to successful suppression of the blocking. In particular the filtering used in downsampling 12 and interpolation 14 back to the original image size must be done carefully in order to remove a large part of the low frequency energy of the original image 11 and to form a seamless connection across the blocks. A suitable filter is a raised cosine or a Kaiser window with a span of 9 pixels. The same filter is used for downsampling 12 and for interpolation 14 to restore the original image size. The span of 9 pixels means that for these two filter types, the weighting for the pixel that is separated from the center of the filter by four pixels is zero. The result is that the filter actually requires seven multiply-adds to form a point in the downsampled image 14a.

The downsampling 12 is performed in two steps, downsampling in the row dimension followed by downsampling in the column direction of the image 11. While a composite filter that performs the complete downsample operation in one step could be performed, the number of multiply-adds required is greater than the one dimension at a time approach.

The interpolation 14 is performed in the row and column direction simultaneously. The interpolation 14 may be viewed as inserting pixels in the downsampled image 12a by adding pixels with zero value followed by a filtering operation. The filter is the above-described two dimensional raised cosine or Kaiser window. The actual number of multiply-adds required to build the image is limited, since most of the pixel values are zero. For some of the pixels no multiply adds are required, since there is only one non-zero pixel and the weight for that pixel is one. For other pixels two multiply-adds are required, while for yet others, four multiply adds are required. The organization of the sequence of multiply-adds so that only the required computations are performed makes for fast operation.

Normalization 16 proceeds by forming the square-root of the sum-of-squares of the discrete cosine transform coefficients. A multiplier that normalizes the energy of the block of discrete cosine transform coefficients is found by dividing the normalized energy constant, a parameter of the compression, by the energy in the block. Each of the coefficient values is multiplied by the resulting value.

An exception is made if the energy in the block is larger than a predetermined threshold value, as id indicated by the bypass path around the normalization step 16a and through a threshold determination step 21 to the weighting step 17. This large value of the energy in a block of the difference image 13a indicates that there is an area with high dynamic range within the block. This high dynamic range shows the effects of the quantization and the blocking more prominently than does the surrounding lower energy blocks. In these areas no normalization is performed, as is indicated by the bypass path through the threshold determination step 21. The discrete cosine transform coefficients are quantized 18 by rounding to form integers without modifying the amplitude of the coefficients.

The frequency weighting 17 is performed after normalization 16 and before quantization 18 of the coefficients. The frequency weight is, for example, a simple exponential weighting function: $W(row, column) = e^{-(row+column)/c}$, where W is the weight, row is the number of the row in the block from 0 to 7, column is the number of the column within the block from 0 to 7, and c is the weighting parameter. After the frequency weighting 17, the discrete cosine transform coefficients are quantized 18 by rounding them to form integers as was discussed above.

Figure 2:
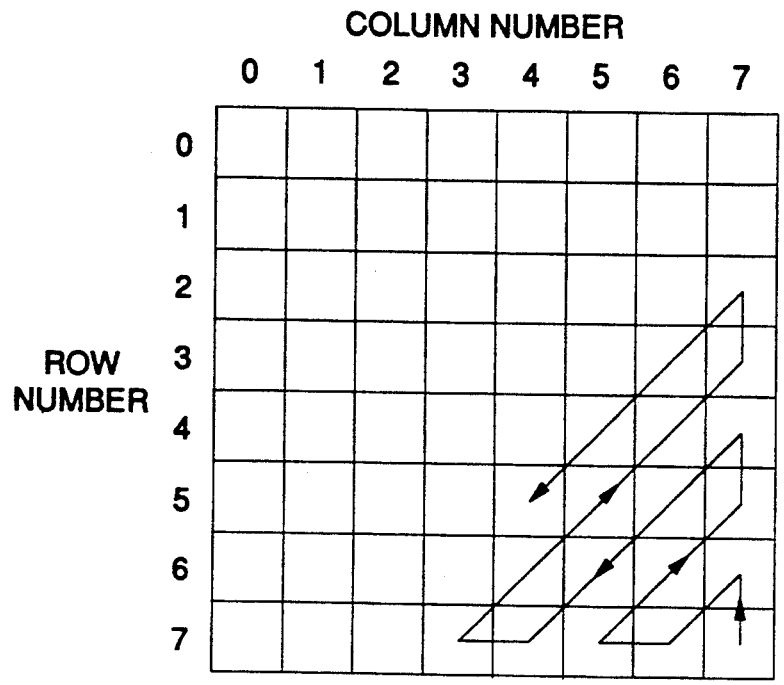
FIG. 2 shows how high frequency component deletion is performed in the apparatus and method of FIG. 1 starting at the highest frequency and proceeding toward lower frequencies until a desired percent of the energy has been removed.

With reference to FIG. 2, the high frequency values are removed by deleting the high frequency components in order (illustrated by the arrowed line) until a percentage of the energy in the block has been removed. The percentage of the energy that is retained is a parameter of the compression. By including the number of coefficient values that have been retained in the coded block information, the level of deletion is retained.

Figure 4:
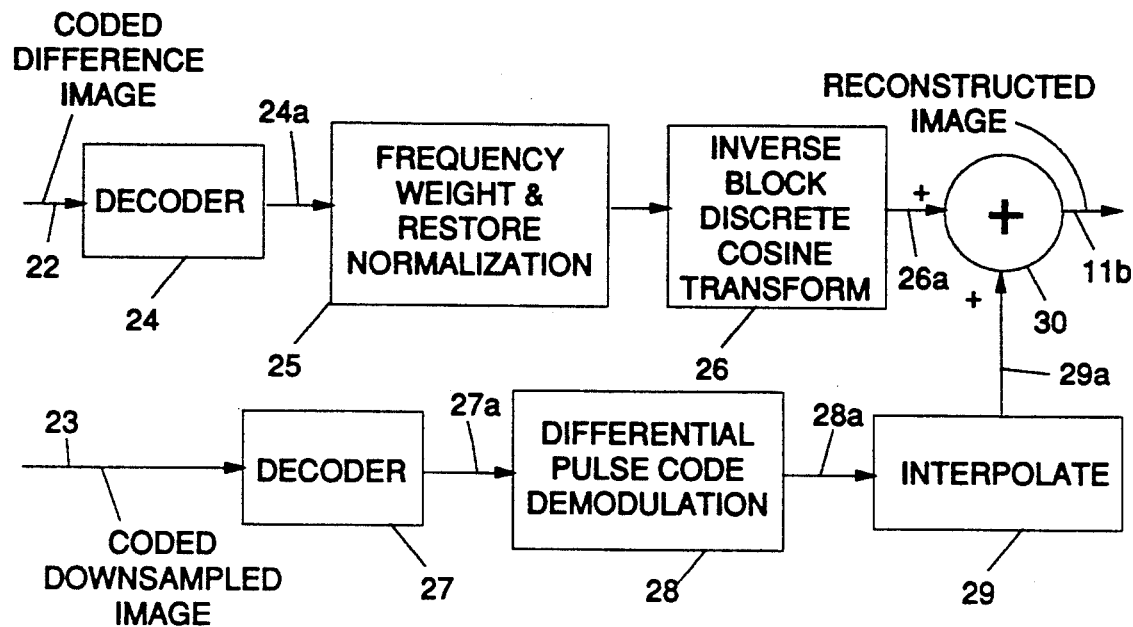
FIG. 4 shows an image reconstruction apparatus and method in accordance with the principles of the present invention, which uses a minified image and a recovered difference image to reconstruct the original image.

Referring to FIG. 4, on reconstruction, the coded downsampled image 23 is reconstructed by decoding the Huffman (or other) code and inverting the differential pulse code modulation process 19. The downsampled image 23 is interpolated back to the full image size in the same manner as used in the compression process. The interpolated image is ready to be added to the difference image as soon as it is reconstructed.

The reconstruction of the coded difference image 22 to produce a recovered difference image 26a is performed by decoding the Huffman (or other) code recovering the weighted, normalized discrete cosine transform coefficients. The weighting and normalization are removed 25 by multiplying by the reciprocal of the weights used in during compression, and by multiplying each coefficient by the ratio between the normalization energy and the energy in the block. The energy in the block is part of the coded information with the coefficients. The normalization energy is a parameter of the compression and is passed with the compressed image to permit decompression.

The difference image is recovered by performing an inverse discrete cosine transform 26 on the cosine transform coefficients. The original image 11 is recovered by adding the recovered difference image 26a to a recovered interpolated downsampled image 29a.

Figure 5:
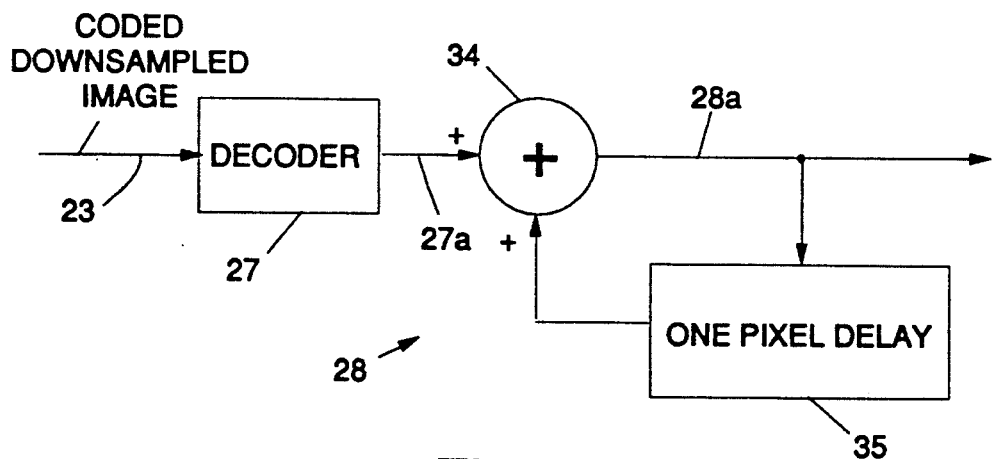
FIG. 5 shows recovery of the downsampled image in the image reconstruction apparatus and method of FIG. 4.

Expansion of the compresses image 11a on recovery from archive is as follows. The expansion of the image follows the inverse of the compression steps. The expansion architecture and processing steps are shown in FIG. 4. The minified image (coded downsampled image 23) and the normalization value are recovered. The minified image (coded downsampled image 23) is recovered by performing a bit-preserving reconstruction of the image as is shown in FIG. 5. As is shown in FIG. 5, the differential pulse code demodulation processing 28 is performed by means of a decoder coupled to a summing device 34 whose output is delayed in a one pixel delay 35 and fed back and summed with the decoded downsampled image 27a in the summing device 34. The coded difference image 22 is recovered by recovering the quantized discrete cosine transform coefficients using the block energy value recorded is a second word of a compressed block. The inverse discrete cosine transform 26 is then performed, resulting in the recovered difference image 26a. The minified image (coded downsampled image 23) is then interpolated 29 back to full size and added to the recovered difference image 26a in the adder 32 to recover the approximation to the original image 11 (reconstructed original image 11b).

The differential pulse code modulation processing 28 of the coded downsampled image 23 is shown in more detail in FIG. 5. The simplicity of the differential pulse modulation decoder 28. The result of using the differential pulse code modulation decoder 28 is the recovered downsampled image 28a that is to be interpolated 29 back to the full size (recovered interpolated image 29a) and added 30 to the recovered difference image 26a derived from the cosine transform processing 26.

The use of the compression scheme of the present invention results in a noise value that is the difference between the original image 11 and the reconstructed original image 11b. The use of the energy threshold frequency cutoff and the energy normalization level establish the noise level relative to the image energy level. Since the low frequencies are removed in the minified image 23, the energy that is considered is the energy of the high frequencies. This removal of the low frequencies before compression makes the compression local. That is, the compression depends not on the image intensity over a large area, but on the changes in intensity over a small area. Considering the noise to be the departure from the difference image 13a, the signal-to-noise ratio can be calculated, and is given by:

$$SNR_{deletion} = 10 \log(1 - \text{proportion\_energy\_deleted})$$

A second component of the signal-to-noise ratio is the quantization noise. If the quantization level is established with reference to the energy level of the block, the quantization noise component can be established by analysis, and wherein $$SNR_{quantization} = 10.79 + 20 \log(\text{Normalization\_level}),$$

where Normalization_level is the level that the signal energy is raised to before the quantization 18 is performed. The quantization 18 is done by rounding, not by truncation. Truncation loses the 10.79 dB of signal-to-noise ratio.

The two components of noise add as the sum of squares. The composite signal-to-noise ratio is therefore the square root of the sum of the squares of the individual noise values compared to the energy in the difference image 13a. By this analysis, the present invention is balanced when the two noise sources generate equal amounts of noise. In fact, the eye is more sensitive to the loss of high frequencies than to the added general noise in this application. It is therefore appropriate to make the quantization noise about 3 times the noise due to the deletion of the high frequency energy.

The use of the weighting coefficient on compression requires the use of a reciprocal weighting coefficient on the expansion in order to restore the original values to the image 11. It is possible for the values of the weighting coefficient to be negative and positive. In this case, the high frequencies are accented on compression, reducing the amount of compression and increasing the quality of the compressed image.

The compressed image 11a has two segments, the minified image 23 appropriately coded and the discrete cosine transform compressed coded difference image 22. The format of the file of the compressed image 11a is the concatenation of a small image plus the compressed large image. Each block of the large image consists of a 6 bit word indicating the number of coefficients retained, a word indicating the energy level of the block in the coded difference image 22, and the remaining discrete cosine transform coefficients. The block is Huffman coded to support the last step of the compression. In the image file header, there must be an indication of the level of the normalization of the image block energy.

Figure 3:
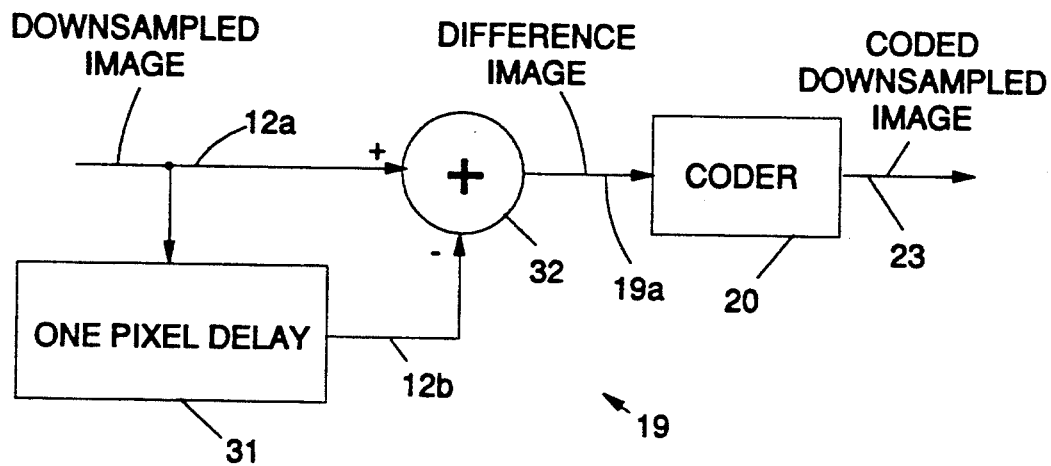
FIG. 3 shows a differential pulse code modulation encoding method employed in the apparatus and method of FIG. 1.

The small image is encoded using a simple differential pulse code modulation scheme shown in FIG. 3. As is shown in FIG. 3, the scheme employs a one pixel delay 31 that delays the downsampled image 12a which is then summed with the downsampled image 12a to produce the difference image 19a. The difference image 19a is applied to the coder 20 that produces a coded downsampled image 23. Successive differences in the pixel values are encoded using the Huffman encoder. The use of something more than the very simple encoding is not warranted. There are 1/16 the number of pixels in the small image compared to the large image. The use of the Huffman coder reduces the number of bits by a factor of approximately 2.5 depending on the image. The result is a compression ratio of 40:1 for the small image. Compression of the difference image 13a by a factor of 40:1 results in an overall compression ratio of 20:1, an acceptably high compression ratio with very little degradation. Further compression of the difference image 13a results in unacceptable degradation. It is therefore of little value to further reduce the size of the compressed small image. However, the further reduction of the minified image 23 may be accomplished by applying minification along with discrete cosine transform compression of the difference image 13a.

The perceived image quality provided by the present invention is very good. The compression from 12 bits per pixel to about 1.2 bits per pixel leave an image that is very difficult to discriminate from the original image 11. Beyond this factor of 10:1 compression the image begins to degrade slightly. At 15:1 compression, high contrast areas of the image begin to show the blocking of the discrete cosine transform. At 20:1 compression sharp edges of the image are noticeably softer due to the loss of the high frequencies.

There are three compression parameters, the energy normalization constant, the percent energy retained, and the frequency weighting coefficient. The energy normalization constant is a number between 5 and 5000. The percent energy retained is a number between 1 and 100. The frequency weighting coefficient is a number between 2 and 10. The compression may be controlled using a single number between 1 and 100. The compression control number can be mapped into the three compression parameters using a suitable function to establish the quality of compression.

The amount of compression is variable. If there is much detail in the image, the compressed image is longer than an image with little detail.

Thus there has been described a new and improved image compression apparatus and methods for use in compressing and reconstructing radiological images. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An image compression method comprising the steps of:

downsampling an original radiological image to produce a downsampled image;

interpolating the downsampled image back to its original size to provide a smoothed image;

processing the smoothed image and the original image to provide a difference image;

processing the difference image using a discrete cosine transform to provide a transformed difference image;

frequency weighting the transformed difference image to provide a weighted difference image;

quantizing the weighted difference image to provide a quantized difference image;

encoding the quantized difference image to produce an encoded difference image;

differential pulse code modulating the downsampled image to produce a differential pulse code modulated downsampled image; and encoding the differential pulse code modulated downsampled image to produce an encoded downsampled image;

whereby the encoded difference image and the encoded downsampled image comprise a compressed image, and wherein compression is adapted to remove artifacts present in the original radiological image caused by blocking.

2. The method of claim 1 which further comprises the step of normalizing the compressed image by means of the steps of:

finding the sum of the squares of the coefficients of the discrete cosine transform;

determining a gain factor such that energy in the transformed difference image is equal to a constant; and applying the gain factor to each of the coefficients of the discrete cosine transform, changing the energy in the transformed difference image to a constant value that is equal to a normalization energy.

3. The method of claim 1 wherein the step of quantizing the weighted difference image comprises the step of rounding coefficients to quantize them to a nearest integer.

4. The method of claim 1 wherein, if the energy in the transformed difference image is larger that a predetermined threshold, the step of quantizing the weighted difference image comprises quantizing the coefficients at their original level so that the quantization noise is reduced, thus suppressing blocking effects.

5. The method of claim 1 wherein the step of encoding the quantized image comprises the step of encoding weighted coefficient values using a Huffman code.

6. The method of claim 1 wherein the step of encoding the quantized image comprises the step of encoding weighted coefficient values using an arithmetic code that codes the weighted, quantized coefficients in a code word that maps coefficient values into an interval from zero to one.

7. The method of claim 1 wherein the step of processing the difference image using a discrete cosine transform comprises the step of frequency weighting the transform coefficients wherein lower weights are given to higher frequency components.

8. The method of claim 1 wherein the step of processing the difference image comprises the steps of:

deleting high frequency components having energy below a predetermined threshold; and Huffman coding the remaining quantized discrete cosine transform coefficients.

9. The method of claim 8 wherein the level of quantization of the discrete cosine transform coefficients is adjusted by setting a quantization level that is a function of the energy in the transformed difference image.

10. An image reconstruction method for use with a compressed image comprising an encoded difference radiological image and an encoded downsampled radiological image that produces a reconstructed image, said method comprising the steps of:
- decoding the encoded difference image to produce a decoded difference image;
- frequency weighting and removing the normalization of the decoded difference image to produce a restored transformed difference image;
- transforming the restored transformed difference image using an inverse discrete cosine transform to produce a restored difference image;
- decoding the encoded downsampled radiological image to produce a decoded image;
- differential pulse code demodulating the decoded image to produce a demodulated image;
- interpolating the demodulated image to provide a full scale smoothed image; and
- combining the compressed image and the smoothed image to produce a reconstructed original image.

11. Image compression apparatus comprising:
- means for downsampling an original radiological image to produce a downsampled image;
- means for interpolating the downsampled image back to its original size to provide a smoothed image;
- means for processing the smoothed image and the original image to provide a difference image;
- means for processing the difference image using a discrete cosine transform to provide a transformed difference image;
- means for frequency weighting the transformed difference image to provide a weighted difference image;
- means for quantizing the weighted difference image to provide a quantized difference image;
- means for encoding the quantized difference image to produce an encoded difference image;
- means for differential pulse code modulating the downsampled image to produce a differential pulse code modulated downsampled image; and
- means for encoding the differential pulse code modulated downsampled image to produce an encoded downsampled image;
- whereby the encoded difference image and the encoded downsampled image comprise a compressed image, and wherein compression is adapted to remove artifacts present in the original radiological image caused by blocking.

12. The apparatus of claim 11 which further comprises means for normalizing the compressed image comprising:
- means for finding the sum of the squares of the coefficients of the discrete cosine transform;
- means for determining a gain factor such that energy in the transformed difference image is equal to a constant; and
- means for applying the gain factor to each of the coefficients of the discrete cosine transform, changing the energy in the transformed difference image to a constant value that is equal to its normalization energy.

13. The apparatus of claim 11 wherein the means for quantizing the weighted difference image comprises means for rounding coefficients to quantize them to a nearest integer.

14. The apparatus of claim 11 wherein, if the energy in the transformed difference image is larger that a predetermined threshold, the means for quantizing the weighted difference image comprises means for quantizing the coefficients at their original level so that the quantization noise is reduced, thus suppressing blocking effects.

15. The apparatus of claim 11 wherein the means for encoding the quantized image comprises means for encoding weighted coefficient values using a Huffman code.

16. The apparatus of claim 11 wherein the means for coding the quantized image comprises means for encoding weighted coefficient values using an arithmetic code that codes weighted, quantized coefficients in a code word that maps coefficient values into an interval from zero to one.

17. The apparatus of claim 11 wherein the means for processing the difference image using a discrete cosine transform comprises means for frequency weighting the transform coefficients wherein lower weights are given to higher frequency components.

18. The apparatus of claim 11 wherein the means for processing the difference image comprises:
- means for deleting high frequency components containing energy below a predetermined threshold; and
- means for Huffman coding quantized discrete cosine transform coefficients remaining after deleting the high frequency components.

19. The apparatus of claim 18 wherein the level of quantization of the discrete cosine transform coefficients is adjusted by setting a quantization level that is a function of the energy in the transformed difference image.

* * * * *